United States Patent
Brewster

(10) Patent No.: US 9,798,038 B2
(45) Date of Patent: Oct. 24, 2017

(54) DIRECTIONAL FILTER FOR PROCESSING FULL TENSOR GRADIOMETER DATA

(71) Applicant: Bell Geospace Inc., Houston, TX (US)

(72) Inventor: James Brewster, Porter, TX (US)

(73) Assignee: Bell Geospace Inc., Houston, TX (US)

( * ) Notice: Subject to any disclaimer, the term of this patent is extended or adjusted under 35 U.S.C. 154(b) by 775 days.

(21) Appl. No.: 13/966,722

(22) Filed: Aug. 14, 2013

(65) Prior Publication Data

US 2014/0052375 A1 Feb. 20, 2014

Related U.S. Application Data

(60) Provisional application No. 61/683,255, filed on Aug. 15, 2012.

(51) Int. Cl.
| | | |
|---|---|---|
| G01N 33/24 | (2006.01) | |
| G01V 7/00 | (2006.01) | |
| G01V 7/06 | (2006.01) | |

(52) U.S. Cl.
CPC . *G01V 7/00* (2013.01); *G01V 7/06* (2013.01)

(58) Field of Classification Search
CPC ........ G01V 7/00; G01V 7/16; G01V 2003/86; G01V 2210/6165; G01V 11/00; G01V 1/30; G01V 1/301–1/308
USPC .................................. 702/2, 11, 5; 382/109
See application file for complete search history.

(56) References Cited

U.S. PATENT DOCUMENTS

| | | | | |
|---|---|---|---|---|
| 7,065,449 B2 * | 6/2006 | Brewster | ................ | G01V 7/16 702/5 |
| 7,113,868 B2 * | 9/2006 | Brewster | ............... | G01V 11/00 702/5 |
| 7,365,544 B2 * | 4/2008 | McCracken | ............ | G01V 3/16 250/253 |

(Continued)

OTHER PUBLICATIONS

Blakely R. J., 1996, Potential Theory in Gravity and Magnetic Applications, Cambridge University Press, ISBN-10: 0521575478, p. 324-326.

(Continued)

*Primary Examiner* — Lam Nguyen
(74) *Attorney, Agent, or Firm* — McDonnell Boehnen Hulbert & Berghoff LLP

(57) ABSTRACT

A directional filter for processing full-tensor gradiometer data is described. The filter processes input data using a method comprising receiving geophysical data collected based on characteristics of geographic features in an environment, and applying a directional filter to the received geophysical data in a first instance so as to provide first filtered data. A filtering direction of the directional filter is determined based on properties in the received geophysical data. The method also includes updating the filtering direction based on properties in the first filtered data, applying the directional filter to the received geophysical data in a subsequent instance using the updated filtering direction so as to provide subsequent filtered data, and based on the updated filtering direction having a subsequent update less than a threshold, outputting directionally filtered data. The subsequent update is determined due to properties in the subsequent filtered data output from the subsequent instance.

20 Claims, 6 Drawing Sheets

(56) References Cited

U.S. PATENT DOCUMENTS

| | | | | |
|---|---|---|---|---|
| 7,542,850 B2* | 6/2009 | Humphrey | ............... | G01V 7/16 |
| | | | | 324/330 |
| 8,027,517 B2* | 9/2011 | Gauthier | .................. | G01V 1/32 |
| | | | | 382/109 |
| 8,332,184 B2* | 12/2012 | Barnes | ..................... | G01V 3/38 |
| | | | | 702/189 |
| 2005/0017721 A1 | 1/2005 | McCracken et al. | | |
| 2005/0197773 A1 | 9/2005 | Brewster et al. | | |
| 2006/0004519 A1 | 1/2006 | Humphrey et al. | | |
| 2006/0036367 A1 | 2/2006 | Brewster | | |
| 2009/0287464 A1 | 11/2009 | Barnes | | |

OTHER PUBLICATIONS

Briggs I. C., 1974, Machine contouring using minimum curvature: Geophysics, 39, 39-48.

Pedersen L. B. and Rasmussen T. M., 1990, The gradient tensor of potential field anomalies; some implications on data collection and data processing of maps: Geophysics, 55, 1558-1566.

Sanchez V., Sinex D., Y. Li, Nabighian M., Wright D. and Smith D., 2005, Processing and Inversion of Magnetic Gradient Tensor Data for UXO Applications, 18th EEGS Symposium on the Application of Geophysics to Engineering and Environmental Problems.

Y. Li, 2001, Processing gravity gradiometer data using an equivalent source technique: SEG Technical Program Expanded Abstracts, 1466-1469.

International Search Report and Written Opinion of the International Searching Authority prepared by the Korean Patent Office in International Application No. PCT/US2013/054895 mailed Dec. 27, 2013.

International Preliminary Report on Patentability (IPRP) prepared by the Korean Patent Office in International Application No. PCT/US2013/054895 mailed Feb. 26, 2015.

* cited by examiner

DIRECTIONAL FILTER FOR PROCESSING FULL TENSOR GRADIOMETER DATA

CROSS-REFERENCE TO RELATED APPLICATION

The present patent application claims priority to U.S. provisional patent application No. 61/683,255, filed on Aug. 15, 2012, the entirety of which is hereby incorporated by reference.

BACKGROUND

Gravity surveying is one technique in modern exploration for mineral and petroleum commodities. For example, detection of geophysically significant subsurface anomalies potentially associated with ore bodies or hydrocarbon deposits can be made using gravity surveying techniques since the existence of gravitational anomalies usually depends upon the presence of an excess or deficit mass associated with the deposit. The presence of the deposit can be associated with a gravitational anomaly of the body. The variation in gravity due to the presence of a body of ore can be 0.00002% of the normal Earth gravity field, for example. This relatively small effect is normally measured in units of milli gals (mGal), which is the unit for the free air and Bouguer gravity field measurements (1 mGal is equivalent to $10^{-5}$ m/s$^2$).

Many gravitational measurements have been made using instruments of the LaCoste/Romberg type that are essentially ultrasensitive spring balances detecting a small difference in weight caused by the gravity anomaly. The measurements are subject to a wide variety of environmental influences, and measurements should be performed relative to a standard point that is used regularly during the survey as a fixed reference for removal of drifts in the instrument.

In addition, some large scale geophysical prospecting has progressed towards gradiometry. In principle, measurement of a gradient of a gravity field over a known baseline allows accelerations due to motion of the platform itself to be cancelled out. Gravity gradients are the spatial derivative of the gravity field, and have units of mGal over distance such as mGal/m. The standard unit of gravity gradiometry is the Eötvös (E), which is equal to $10^{-9}$/s$^2$ or a tenth of a mGal over a kilometer (e.g., gradient signatures of shallow Texas salt domes are typically 50-100 E).

One type of gradiometry that has been used is three-dimensional Full Tensor Gradient (3D FTG) technology. FTG technology was developed by the US Navy and later adapted to the Oil & Gas industry to complement seismic technology and provide an independent method of imaging underwater salt and basalt areas, for example. Thus, gravity gradient measurements were originally collected using marine vessels or large ships to survey oceans. For example, using Bell Geospace's Marine-FTG™ technology, gravity gradient data collected from ocean surveys can be used to delineate subsalt and sub-basalt structures, predict bases of salt, and map other areas for valuable minerals.

Later, as gravity surveying moved on land, fixed-wing aircraft were adopted for data acquisition through airborne surveys. For example, a fixed-wing aircraft, such as a Cessna Grand Caravan, could be modified for airborne testing and evaluation, such as used within Bell Geospace's Air-FTG® technology. The success of airborne gravity gradient surveying to cover wide onshore areas with high precision data acquisition has attracted the interest of the mining industry. However, while such data is very useful for mineral exploration, there continues to be a desire to produce higher quality data.

A Full Tensor Gradiometer (FTG) includes three distinct modules known as gravity gradient instruments each measuring components of differential curvature. By processing outputs of the FTG, useful quality control measures and insight into a level and color (spectral shape) of gradiometer noise can be determined. When analyzing survey data, noise can be caused by environmental changes such as temperature and pressure and may be evident when studying output maps of the data.

SUMMARY

In one aspect, a method is provided that comprises receiving geophysical data collected based on characteristics of geographic features in an environment, and applying a directional filter to the received geophysical data in a first instance so as to provide first filtered data. A filtering direction of the directional filter is determined based on properties in the received geophysical data. The method also comprises updating the filtering direction based on properties in the first filtered data, and applying the directional filter to the received geophysical data in a subsequent instance using the updated filtering direction so as to provide subsequent filtered data. The method further comprises based on the updated filtering direction having a subsequent update less than a threshold, outputting directionally filtered data, wherein the subsequent update is determined due to properties in the subsequent filtered data output from the subsequent instance.

In another aspect, a non-transitory computer-readable medium is provided that has stored therein instructions, that when executed by a device, cause the device to perform functions. The functions comprise receiving geophysical data collected based on characteristics of geographic features in an environment, and applying a directional filter to the received geophysical data in a first instance so as to provide first filtered data. A filtering direction of the directional filter is determined based on properties in the received geophysical data. The functions also comprise updating the filtering direction based on properties in the first filtered data, and applying the directional filter to the received geophysical data in a subsequent instance using the updated filtering direction so as to provide subsequent filtered data. The functions also comprise based on the updated filtering direction having a subsequent update less than a threshold, outputting directionally filtered data, wherein the subsequent update is determined due to properties in the subsequent filtered data output from the subsequent instance.

In still another aspect, a device is provided that comprises a processor, and a computer-readable medium, configured to store instructions, that when executed by the processor, cause the device to perform functions. The functions comprise receiving geophysical data collected based on characteristics of geographic features in an environment, and applying a directional filter to the received geophysical data in a first instance so as to provide first filtered data. A filtering direction of the directional filter is determined based on properties in the received geophysical data. The functions also comprise updating the filtering direction based on properties in the first filtered data, and applying the directional filter to the received geophysical data in a subsequent instance using the updated filtering direction so as to provide subsequent filtered data. The functions further comprise based on the updated filtering direction having a subsequent update less than a threshold, outputting directionally filtered data, wherein the subsequent update is determined due to properties in the subsequent filtered data output from the subsequent instance.

These as well as other aspects, advantages, and alternatives, will become apparent to those of ordinary skill in the art by reading the following detailed description, with reference where appropriate to the accompanying figures.

DETAILED DESCRIPTION

Figure 1:
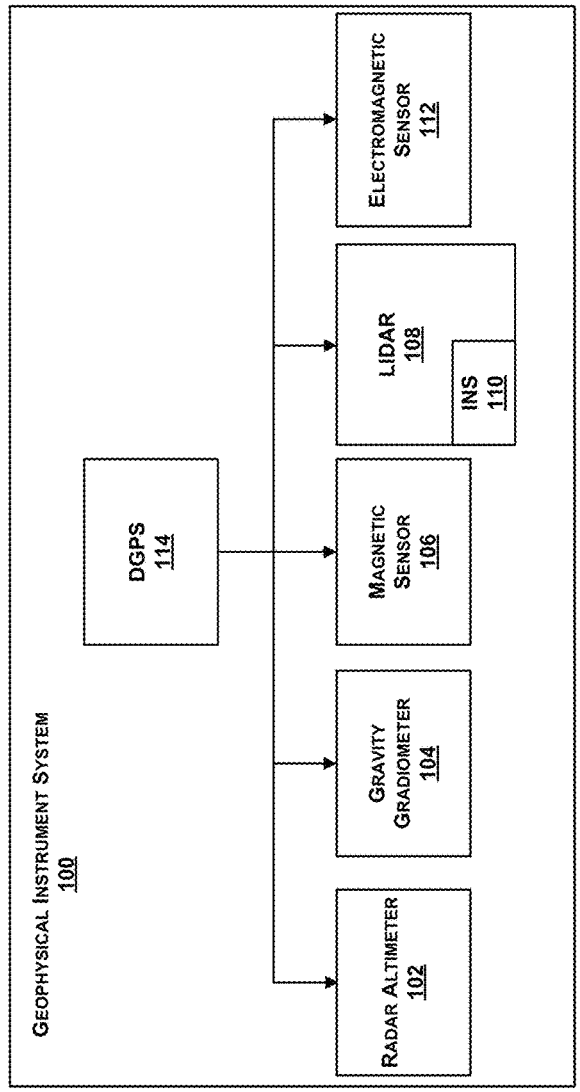
FIG. 1 is a block diagram illustrating an example geophysical instrument system, which may collect geophysical data.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples herein, a directional filter for processing full tensor gradiometer data is described. Filtering methods may be used of reducing noise in gravity gradiometry data. Example filtering methods include self-steering directional filtering, which may be applied to data when a source of a gravity anomaly has a well-defined direction.

Gravity gradiometers may be used to measure a spatial variation of a gravity field due to subterranean geological structures. This information can be valuable in exploration for both mineral and hydrocarbon resources. As an example, a geophysical survey may be conducted to measure the gravity field over an area, for example. A geophysical survey is conducted, using specialized instruments, by flying over a terrain of interest. A series of nominally parallel survey lines can be flown until the total region to be surveyed has been covered.

A geophysical survey may be conducted using one or more gravity gradiometer instruments (GGIs). For example, a system including a full tensor gradient (FTG) instrument that has three GGIs can be used. The three GGIs may be oriented in a manner such that, unlike a conventional gravimeter that offers data collection only in the vertical (z) direction, the three GGI system may acquire data from all directions. A GGI can measure the spatial rate of change of the Earth's gravity field and provide a signal from which the instantaneous gradient of gravity can be derived. (Note that a measurement of gravity gradient may be preferred for detection of gravity disturbances from an airborne platform because a direct measurement of gravity cannot distinguish the gravity signal from accelerations of the instrument associated with the motion of the aircraft in the frequency range that is significant for subsurface anomaly detection). Using gravity gradient signals, detection of geophysically significant subsurface anomalies potentially associated with ore bodies or hydrocarbon deposits can be made since the existence of gravitational anomalies usually depends upon the presence of an excess or deficit of mass associated with the deposit.

GGIs of an FTG instrument may be configured to measure gradients of the nine tensor components of the gravity gradient tensor. The gradient (e.g., first derivative) of the gravitational acceleration is expressed by a symmetric tensor $T_{uv}$ defined as:

$$T = \begin{bmatrix} Txx & Txy & Txz \\ Tyx & Tyy & Tyz \\ Tzx & Tzy & Tzz \end{bmatrix} \qquad \text{Equation (1)}$$

where the components of the tensor $T_{uv}$ describe the nine components of the gravity gradients and the tensor $T_{uv}$ is the rate of change of the u component of the gravity vector with displacement in the v direction. Five of the tensor components are independent, and four are redundant as follows:

$Txy=Tyx$ $Txz=Tzx$ $Tyz=Tzy$ $Tzz=-(Txx+Tyy)$          Equation (2)

The first three conditions in Equation (2) arise from the potential field relations, and the forth condition is a consequence of the gravitational potential being a solution to the Laplace equation.

Further, inline components of the gravity gradient tensor are defined as the Txx, Tyy, and Tzz components, and cross components are defined as the Txy, Txz and Tyz components. For example, cross signals are gradients measured when any two accelerometers align horizontally. In-line gradients are measured when the same accelerometers are at a 45 degree angle to horizontal. A gravity gradiometer outputs one cross and one inline signal. Thus, an FTG that includes three GGIs will output three inline and three cross signals.

Other instruments may also be used to conduct a geophysical survey. FIG. 1 is a block diagram illustrating an example geophysical instrument system 100, which may collect geophysical data. The system 100 includes a radar altimeter 102 that is used by aircraft to determine its height above terrain. The radar altimeter 102 determines height above terrain by using radar technology to measure the vertical distance between the aircraft and terrain. The radar altimeter 102 transmits an electronic pulse in the microwave frequency to the Earth's surface. The microwave pulse reflects off the surface and returns to the sensor. Altitude is determined from the pulse travel time (from transmit to receive) and from the waveform of the returned pulse.

The system 100 also includes a gradiometer 104 that measures the spatial rate of change of the Earth's gravity field. The system 100 further includes a magnetic sensor 106 that measures distortions and additions to the magnetic field of the Earth due to rocks and minerals below the aircraft. For example, the magnetic sensor 106 detects the strength and direction of a magnetic field.

In addition, the system 100 includes a light detection and ranging (LIDAR) sensor 108 that transmits light out to a target and the light interacts with and is changed by the target. Some of the transmitted light is reflected and/or scattered back to the LIDAR sensor 108 where it is analyzed. The change in properties of the light enables properties of the target to be determined. For example, the time for the light to travel out to the target and back to the LIDAR sensor 108 can be used to determine the range to the target. The readings from the LIDAR sensor 108 can be used for correction of gradients originating from the terrain, for example.

The LIDAR sensor 108 includes an inertial navigation system (INS) 110. The INS 110 may be included within the geophysical instrument system 106 to provide a strap-down INS for the system 100. For example, the LIDAR sensor 108 may be strapped-down to the aircraft, therefore the INS 110 is a strapped-down INS that measures changes in a moving frame of reference, e.g., the aircraft's fixed axes. Furthermore, the radar altimeter 102 and the magnetic sensor 106 may be coupled to the INS 110 to receive navigational measurements in the aircraft's frame of reference. In contrast, the gradiometer 104 may be coupled to a gimbaled INS to receive INS readings in the gradiometer's frame of reference.

The system 100 can also include an electromagnetic sensor 112 that measures the effects of electrical conductivities of rocks and minerals below the aircraft. The system 100 further includes a differential global positioning system (DGPS) sensor 114. DGPS is a method of providing differential corrections to a global positioning system (GPS) receiver to improve the accuracy of the navigation system. The GPS is a satellite based navigation system that provides real time position, velocity and timing information. By receiving and processing navigation data from three or more satellites, a GPS receiver can calculate its position on the Earth's surface. Using this position, one or more reference receivers at known positions can provide DGPS corrections.

The radar altimeter 102, gradiometer 104, magnetic sensor 106, LIDAR 108, and electromagnetic sensor 112 are each connected to the DGPS 114 to receive position information. Thus, these sensors in the geophysical instrument that are connected to the DGPS 114 can tag data collected during a survey with position coordinates so that an operator will have knowledge of where the data was collected.

In an alternative embodiment, each sensor in the geophysical instrument system 100 (e.g., the radar altimeter 102, gradiometer 104, magnetic sensor 106, LIDAR 108, and electromagnetic sensor 112) may include its own internal or external GPS/DGPS system. Other satellite based positioning systems such as GLONASS, Galileo, WAAS or EGNOSS can also be used.

The system 100 may include more or fewer sensors and/or components as well. For example, the geophysical instrument system 100 may include peripheral equipment, such as a system control and monitoring computer, a survey planning and tracking computer, internal GPS systems, satellite communication systems, and data processing and archival systems. When required, for marine applications, a multi-beam echo-sounder system could also be included for a swath bathymetry measurement and correction of free air gradients. In addition, some of the components of the system 100 can be combined into one component, such as including the gravity gradiometer 104 within a Full Tensor Gradient (FTG) instrument, which can perform the functions of the geophysical instrument and an inertial platform. It should be understood that this and other arrangements described herein are set forth for purposes of example only, and other arrangements and elements can be used instead and some elements may be omitted altogether. Further, many of the elements described herein are functional entities that may be implemented as hardware, firmware, or software, and as discrete components or in conjunction with other components, in any suitable combination and location.

Within examples, a precision needed to survey the Earth using instruments to collect geophysical data may be obscured by inevitable noise in measurements. Techniques that increase a final signal-to-noise ratio are helpful to provide higher probability estimates of subterranean geological structures.

One example of improving an appearance of mapped measurement data is to apply a low-pass filter to collected data. This is a process that removes high frequencies from data while preserving underlying low frequencies. This can have an effect of smoothing out an image, and may be valid if no useful information was present in the high frequency portion of the data set that will be lost.

However, a large number of exploration targets are by their nature directional. That is, elongation of these features defines a direction. One example of such a structure is a mountain ridge. Other examples of this type of geological target encountered in exploration geology include, dykes, banded iron formations, graben, lithological contacts and thrust faults. A spatial frequency represented by these targets may be dependent on which direction the targets are traversed. When moving parallel to a long direction to collect data, a signal is slowly varying and thus, has low frequency. When travelling perpendicular to this direction, crossing the feature, the signal changes rapidly and has high frequency.

These elongated targets can be imaged using a general low pass filter, and/or by using a directional filter. A directional filter is a process that applies a low-pass filter to image features that run in one direction, but leaves features running in a perpendicular direction unchanged. If such a filter is oriented parallel to a characteristic direction of the target, high frequency features that run along the length of the target are removed. High frequency information perpendicular to this direction is preserved. These signals define a width of the target feature, and the presence of such signals (e.g., defining width) make the target visible on the image.

It may be desired that a directional filter be aligned with target geology to increase effectiveness of the filter. Within examples herein, a strike filter imaging method is provided in which a direction of the filter varies and is assigned programmatically or automatically based on properties in the collected data. A formula is used to calculate a strike angle based on a characteristic horizontal direction of the gravity field estimated from its gradient tensor. This direction is referred to as the strike direction, which in geology is defined as a direction in which a fault plane crosses a horizontal plane, and for purposes of filtering methods herein, can be useful in determining which data of received geophysical data to apply the filter to.

Figure 2:
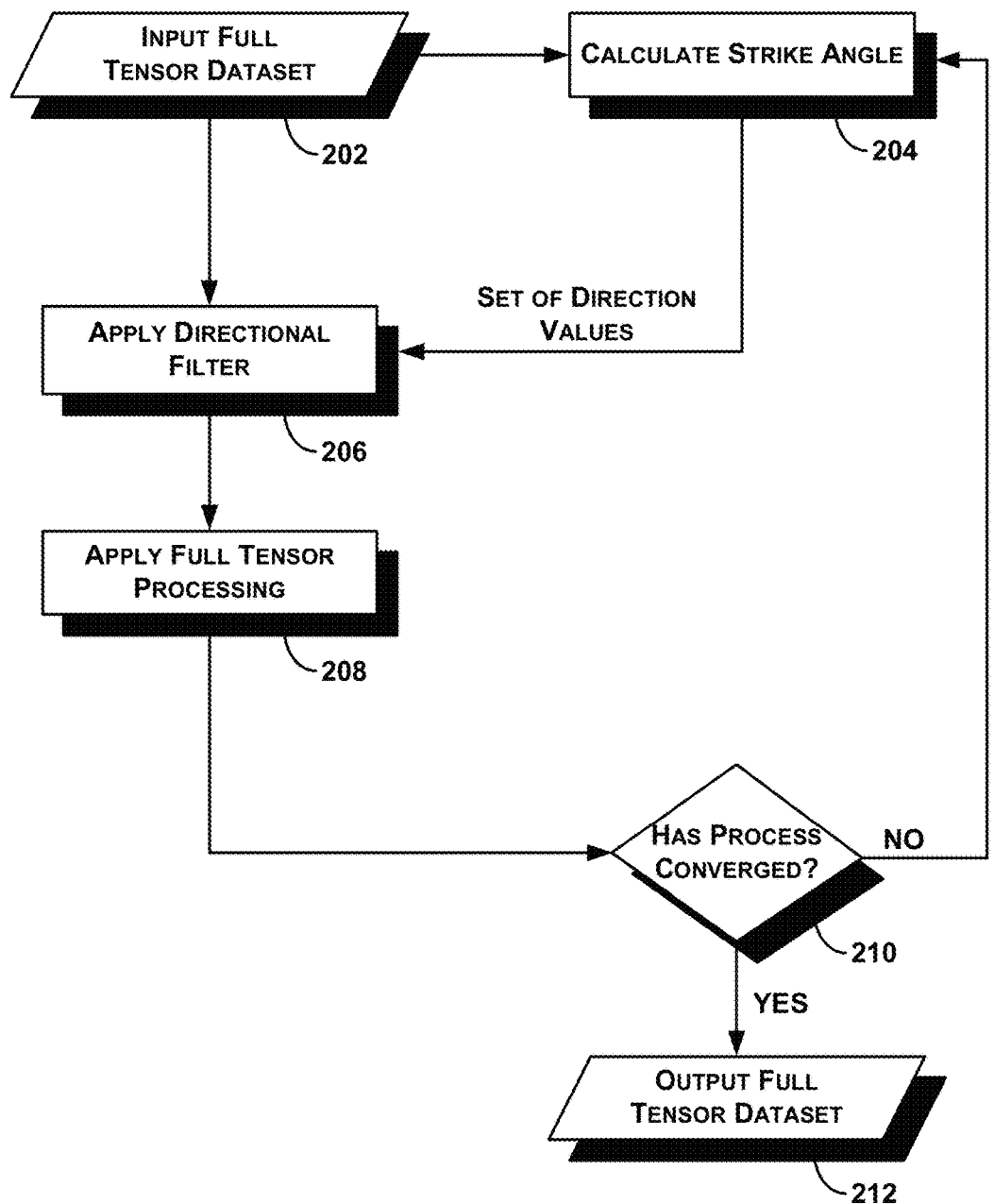
FIG. 2 is a block diagram of an example method for filtering geophysical data, in accordance with at least some embodiments described herein.

FIG. 2 is a block diagram of an example method for filtering geophysical data, in accordance with at least some embodiments described herein. The method shown in FIG. 2 presents an embodiment of a method that, for example, could be used with the system 100 in FIG. 1, for example, or may be performed by a combination of any components of the system 100 in FIG. 1. The method in FIG. 2 may include one or more operations, functions, or actions as illustrated by one or more of blocks 202-212. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method in FIG. 2 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method in FIG. 2, and other processes and methods disclosed herein, each block in FIG. 2 may represent circuitry that is wired to perform the specific logical functions in the process.

At block 202, the method includes input full tensor dataset. For example, an input to the method is a set of full tensor gradiometer data as measured and output by an FTG instrument. In another example, block 202 includes receiving geophysical data collected based on characteristics of geographic features in an environment, and the geophysical data may include full tensor gradiometer data and/or other geophysical data such as magnetic field measurements or full tensor magnetic gradient data.

In some examples, the input dataset may not include all components of the gradient tensor. Some gravity gradiometers may only measure two of the five components. A magnetic gradiometer may only measure part of the tensor as well. Any existing methods can be used to calculate missing gradient components from those that are present.

In other examples, if a potential field is measured over a sufficiently wide area, all components of its gradient tensor can be calculated. For example, if a downward value of gravity is measured over a survey area, all five independent components of the gradient tensor can be calculated, and is true of measurements of any field that obeys the Laplace equation and therefore possesses the same mathematical properties that make strike filter imaging possible. Examples include gravity, electric and magnetic fields.

At block 204, the method includes calculate strike angles. For example, the input dataset can be used to calculate an estimate of a local strike angle. In geology, a strike angle may represent a direction at which a flat (planar) feature crosses the horizontal. In the context of the directional filter, the strike angle represents a direction implied by the gradient field. The strike angle may be determined using Equation (3), as described below.

Components of the gradient tensor can be written as $$T_{ij} = \frac{\partial^2 \phi}{\partial_i \partial_j},$$

where ø is the gravitational potential and i and j are any pair of the Cartesian directions x, y and z. Then, the strike angle, $\theta_s$, can be given by solutions to:

$$\tan 2\theta = 2 \frac{T_{xy}(T_{xx} + T_{yy}) + T_{xz}T_{yz}}{T_{xx}^2 - T_{yy}^2 + T_{xz}^2 - T_{yz}^2} \quad \text{Equation (3)}$$

Solutions of Equation (3) for $\theta_s$ are separated by $\pi/2$. A correct value of $\theta_s$ can be identified by evaluating the objective function $(T'_{xx})^2+(T'_{xy})^2+(T'_{xz})^2$ where prime indicates a value of the tensor components in a rotated coordinate frame. The rotation is about a vertical axis, and is oriented such that x' is parallel to the strike direction. The value of $\theta_s$ that leads to a smaller value of the objective function is an estimated strike direction.

In some examples, a presence of high frequency noise can interfere with estimation of a local strike angle used to steer the directional filter. Under some circumstances, a final result may be improved by applying a standard low pass filter to the data before calculating the strike filter angle. For example, a method that can be used to pre-process the data is upward continuation. This calculates the gradient field that would be observed at an altitude higher than the actual observation altitude.

Thus, by calculating and determining a strike angle, a set of direction values to steer the directional filter can be determined and provided to the directional filter.

Following, at block 206, the method includes applying a directional filter to the received geophysical data in a first instance so as to provide first filtered data. A filtering direction of the directional filter is determined based on properties in the received geophysical data, for example, as described at block 204. In some examples, applying the directional filter to the received data includes applying a low-pass filter to remove high frequency data representative of geophysical features that run in a direction indicated by the filtering direction.

At block 208, full tensor processing is then applied to the resulting filtered full tensor data set, so as to process the directionally filtered data to be consistent with a solution to the Laplace equation. This brings the field measurements in line with the Laplace equation. For example, the gravity gradient tensor obeys the Laplace equation, $T_{xx}+T_{yy}+T_{zz}=0$. This imposes certain conditions on the gradient components that arise from properties of solutions to this differential equation. Generally, the directional filter can be applied to all measured components of the gravity gradient tensor. Afterwards, the components will no longer be consistent with Laplace, and this can be remedied by applying a full tensor processing method to adjust the components to bring them back in conformation with their governing differential equation. An example method of full tensor processing is the Fourier method, as described in Sanchez V., Sinex D., Y. Li, Nabighian M., Wright D. and Smith D., 2005, Processing and Inversion of Magnetic Gradient Tensor Data For UXO Applications, 18th EEGS Symposium on the Application of Geophysics to Engineering and Environmental Problems, which is entirely incorporated by reference. Another example method of full tensor processing is the equivalent source method, as described in Y. Li, 2001, Processing gravity gradiometer data using an equivalent source technique: SEG Technical Program Expanded Abstracts, 1466-1469, which is entirely incorporated by reference.

At block 210, the method includes determining whether the process has converged. For example, on a first iteration, the process may not converge on a first iteration, and a second iteration may be performed where the resulting data set is used to recalculate the strike angles. The process may be ended after a first iteration, however, in some instances in which a determination can be made that the resulting data set is filtered to a sufficient degree (such as by a visual or manual review of the mapped data).

The process may now be repeated with the filtering direction being updated based on properties in the first filtered data, and the input data set (not the filtered data set) again being directionally filtered, but this time using strike angle values calculated using the output of the previous iteration. This way, a set of angle values used to steer the filter is refined at each iteration. Applying the directional filter to the input geophysical data in a subsequent instance using the updated filtering direction outputs subsequent filtered data. The iterations continue until a test of convergence is passed at block 210.

In one example, a test of convergence includes tracking how much the angle values change from one iteration to the next. For example, the process can be set to terminate once an average change in the strike angle is less than about 5 degrees, less than about 10 degrees, or less than some amount in a range of about 1-10 degrees. Alternatively, the output map can be visually inspected to assess a stage at which adequate clarity is reached, and the full tensor directionally filtered dataset can be output, at block 212.

Thus, within examples, the method in FIG. 2 may be performed to iteratively update the filtering direction based on filtered data output from a previous application of the directional filter, and apply the directional filter to the received geophysical data in additional subsequent instances until the subsequent update to the updated filtering direction is less than the threshold.

In some instances, geological features that run in different directions may cross each other. Even if the geological features do not actually intersect, the features may exist at different depths. When this happens, assigning a single direction to each point in space may not be the optimum way to process. One way to proceed in these instances is to apply the strike filter imaging iteratively. The first pass may be performed as described in FIG. 2. Then after subtracting this result from the input, strike filter imaging can be applied to the residual. The outputs from each iteration can be summed to produce a final map.

Figure 3:
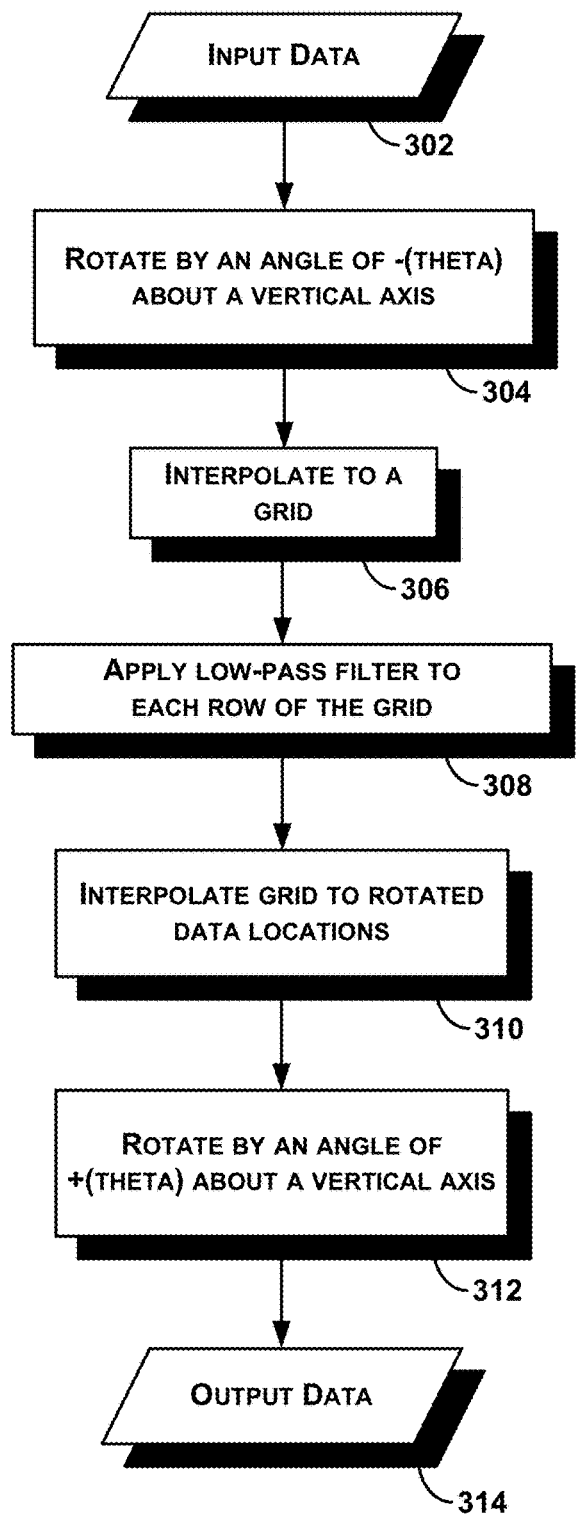
FIG. 3 is a block diagram of another example method for filtering geophysical data, in accordance with at least some embodiments described herein.

FIG. 3 is a block diagram of another example method for filtering geophysical data, in accordance with at least some embodiments described herein. The method shown in FIG. 2 presents an embodiment of a method that, for example, could be used with the system 100 in FIG. 1, for example, or may be performed by a combination of any components of the system 100 in FIG. 1.

Within examples, the method in FIG. 3 may be used to apply a directional filter to a data set, as described above as a portion of the method of FIG. 2.

Initially, at block 302, data is input to the filter. Each item in the input data set includes four values such as, a measured quantity and three values, x, y and z to specify the location at which the quantity was measured.

At block 304, the x and y values of the input data is transformed by rotating the values by an angle of $-\theta$ about a vertical axis. This can be accomplished by applying $x \to x \cdot \cos(\theta) + y \cdot \sin(\theta)$ and $y \to -x \cdot \sin(\theta) + y \cdot \cos(\theta)$ resulting in rotated data.

At block 306, the rotated data is now gridded. For example, the values that are sampled at locations related to trajectory of the survey vehicle are resampled to a set of locations that form a square lattice of evenly spaced points. This can be accomplished by interpolating to estimate values at these locations that now no longer correspond to locations where the data was acquired. One method performing the interpolation includes minimum curvature gridding.

Following, at block 308, a directional filter can be applied to the data by treating each row of the grid as an isolated, one-dimensional sequence of values. Applying a low pass filter on a row-by-row basis removes high frequencies that run in the direction of the rows. High frequency information in the perpendicular direction, represented by columns of the array, is largely unchanged. The low pass filter can, for example, be a digital implementation of a Butterworth filter.

Information from this directionally filtered grid is now interpolated back to the original data locations, as shown at block 310. This can be accomplished by bilinear interpolation. For example, the x and y values can be restored to their original state by reversing the previously executed transformation, $x \to x \cdot \cos(\theta) - y \cdot \sin(\theta)$ and $y \to x \cdot \sin(\theta) + y \cdot \cos(\theta)$, so as to rotate the values by an angle of $+\theta$ about the vertical axis, as shown at block 312. The result is a set of observations that have been processed through a low pass filter that is highly biased towards a direction an angle $\theta$ from the x-direction, as shown at block 314.

The strike filter imaging method may require that the direction of the filter varies from location to location. To do this with accuracy, the above algorithm may be executed once for every angle value that is present. However, this may require much computation time. In other examples, the process can be performed by pre-calculating directionally filtered versions of the data for a set of selected angle values. The filtered output at a location for a given angle can then be found by first identifying two pre-calculated data sets with the nearest angles. Then linear interpolation between these two values is used to estimate the value at the required angle.

As an example, the pre-calculated filtered data sets can be generated using directions that are multiples of 10 degrees. A given location may have the strike angle of 67 degrees, for example. Then, the nearest two pre-calculated data sets are those for 60 degrees and 70 degrees. A value of the filter output for the angle of 67 degrees is now estimated using $v_{67} = (3/10) v_{60} + (7/10) v_{70}$ where $v_\theta$ is the value of the filter output for a direction angle $\theta$.

Figure 4A:
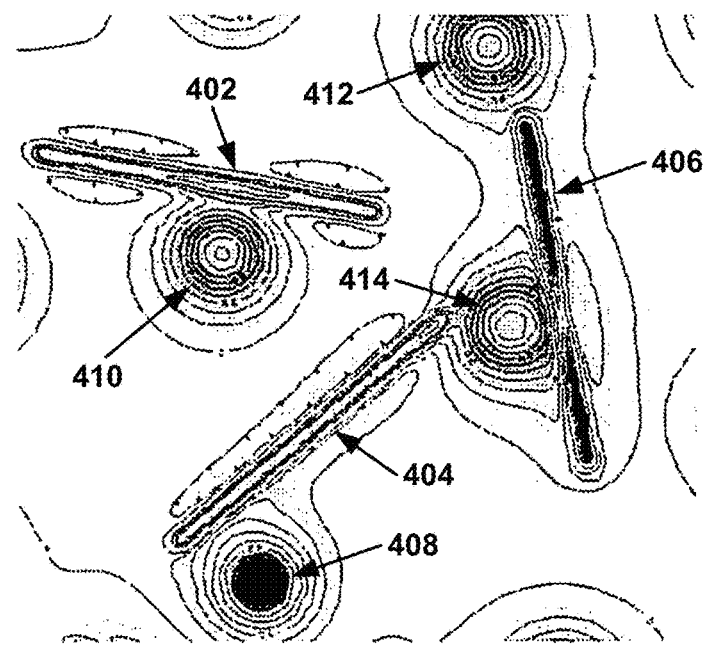
FIGS. 4A-4B conceptually illustrate examples of input of raw data and output of directionally filtered geophysical data.
Figure 4B:
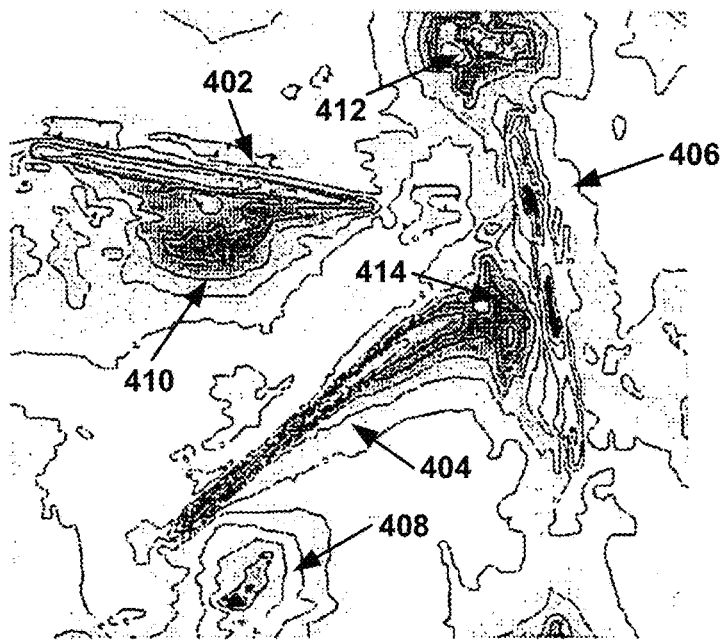

FIGS. 4A-4B conceptually illustrate example of an input of raw data and output of directionally filtered geophysical data. An artificial data set was used and constructed by calculating a gravity field due to a set of randomly located and oriented objects with simple geometric shapes. Placed below the observation plane and scaled appropriately, such an array of objects can be used to simulate a field due to geological sources. Elongated sources 402, 404, and 406 were simulated using horizontal rod-like objects. More precisely, the rods were horizontal, square cross-sectioned prisms, 2000 m in length and 20 m wide. Compact, isolated sources were simulated using spherical sources 408, 410, 412, and 414. In FIG. 4A, a map of the Tzz gradient component is observed on a plane above such an array of simulated sources. The circular signatures of the spherical sources are interspersed with the linear features generated by the long, thin prisms.

FIG. 4B illustrates the map of the Tzz gradient component after application of the directional filter. The amplitudes of the circular features relative to those of the elongated features have been dramatically reduced. Although the filter may not have made this image clearer in this case, the ability of the strike filter to discriminate between sources of different characteristic geometry has been demonstrated. Although narrow, and therefore containing high frequency information the field due to the long, thin prism sources were not filtered as strongly as that due to the wider spherical sources.

Thus, the directional filter is selective in action, and reduces amplitude of the circular features due to spherical sources more than it reduces amplitude of the elongated features due to the rod-like sources.

Figure 5A:
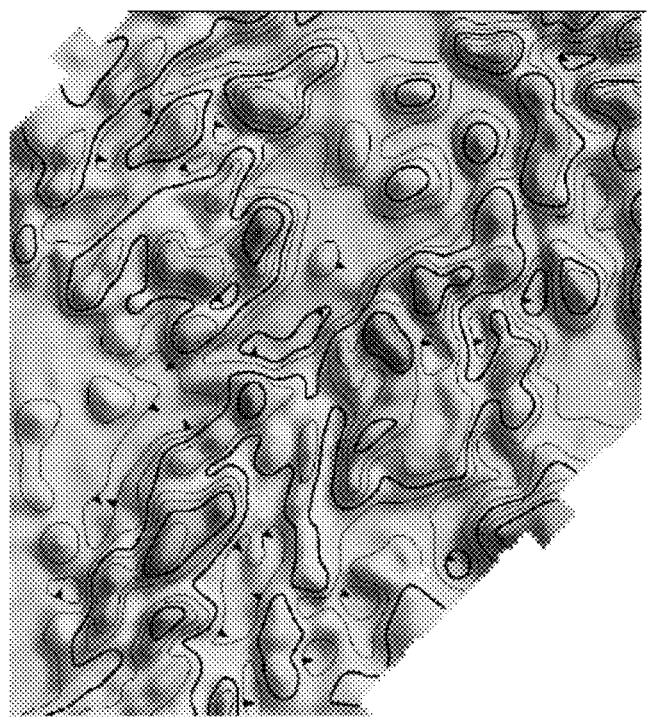
FIGS. 5A-5B conceptually illustrate other examples of input of raw data and output of directionally filtered geophysical data.
Figure 5B:
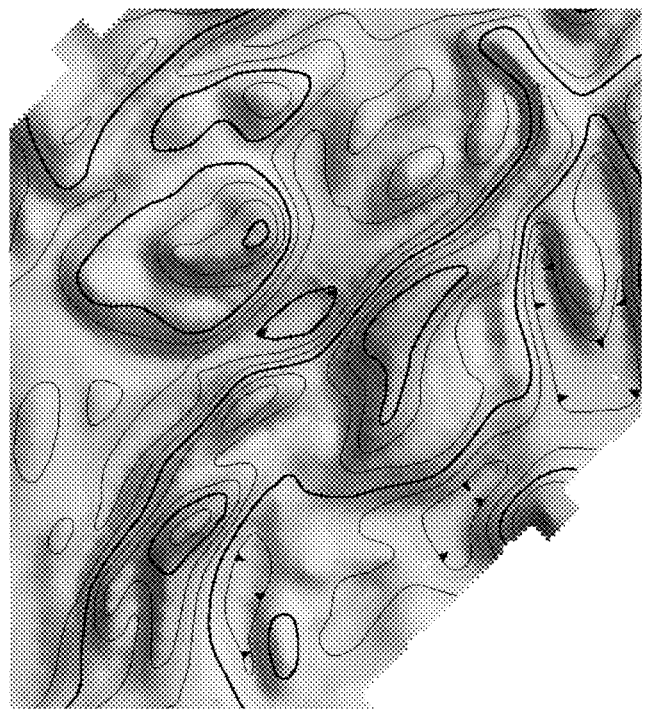

FIGS. 5A-5B conceptually illustrate examples of other input of raw data and output of directionally filtered geophysical data. In this example, input gravity gradient field was generated using real terrain as a set of sources. The gravity field over a given area was calculated using digital elevation information. FIG. 5A illustrates a resulting Tzz gradient field of the data. After strike filter imaging, a map as shown in FIG. 5B is generated. Most of the isolated features due to individual hills have been removed and replaced by elongated features that indicate principal directions present in the field. Geological detail has been erased in FIG. 5B and replaced with more general information about underlying trends. This can be valuable to identify directional features of geological significance.

In some examples, input data can be processed to select where the filter is applied, or to what data the filter is applied. A manner of assessing how directional the gradient field is at any given location can be accomplished using a dimensionless quantity known as the invariant ratio, as shown in Equation (4).

$$R = -\frac{(I_2/2)^2}{(I_1/3)^3}$$ Equation (4)

where $$I_1 = T_{xx}T_{yy} + T_{yy}T_{zz} + T_{xx}T_{zz} - T_{xy}^2 - T_{yz}^2 - T_{xz}^2$$ Equation (5)

and $$I_2 = T_{xx}(T_{yy}T_{zz} - T_{yz}^2) + T_{xy}(T_{yz}T_{xz} - T_{xy}T_{zz}) + T_{xz}(T_{xy}T_{yz} - T_{xz}T_{yy})$$ Equation (6)

It can be shown that $$0 \leq R \leq 1$$ Equation (7)

The two extreme values of R have a straightforward physical interpretation, where R=0 implies that the source of the gradient field is elongated, and R=1 implies that the source of the gradient field is monopole in nature.

The invariant ratio method can be used to select where to apply the filter, so as to only apply the filter in locations where it may be appropriate. Such appropriate locations may be associated with a small value of R, which indicates a directional gradient field. If R is calculated at each of the observation locations, then fraction of the locations that have lowest values can be identified. The direction filter can then be applied only to this subset of the data. For example, the directional filter could be applied at data locations that have R-values in the lowest 75 percent, or some other threshold percentage (such as lowest 80 percent or lowest 90 percent).

As another example, portions of the survey data where the directional filter is not applied can be replaced with an output of a standard two-dimensional low-pass filter to fill-in data. For example, using the same cut-off value as above, 75 percent of the data with the lowest R-values could be replaced with an output of the directional filter and a remaining 25 percent with largest R-values could be replaced with an output of a standard low-pass filter.

Figure 6:
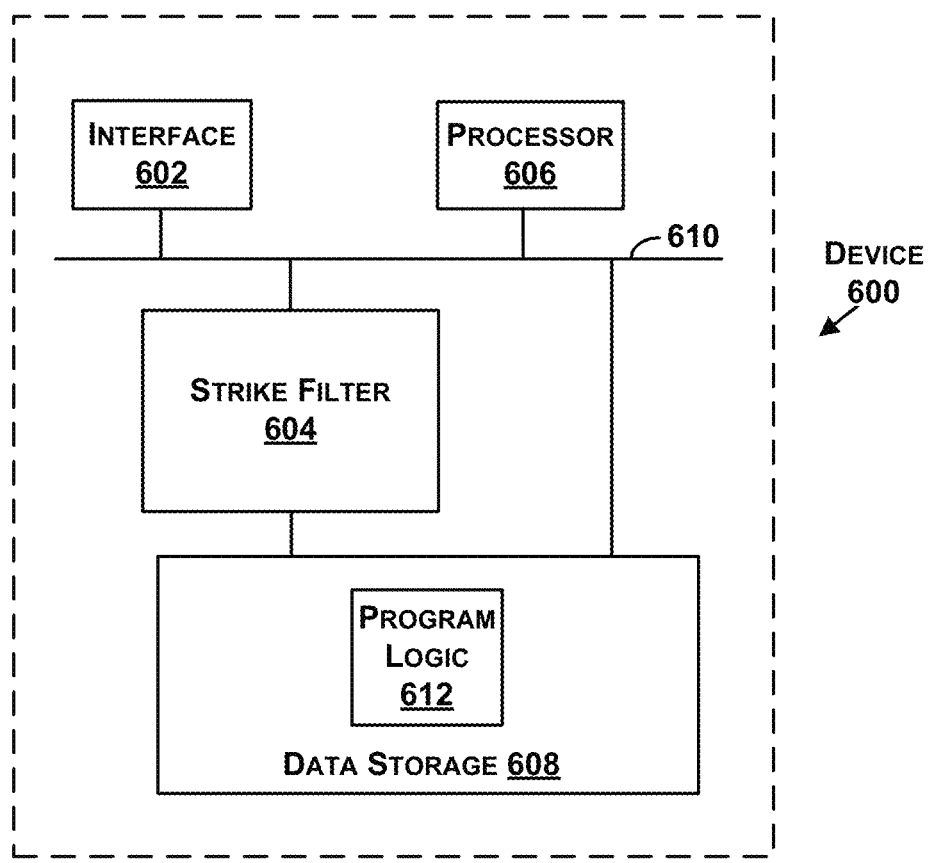
FIG. 6 illustrates a schematic drawing of an example computing device.

FIG. 6 illustrates a schematic drawing of an example computing device 600. The computing device 600 may be configured to perform any of the methods described herein, such as the methods in flowcharts illustrated in FIGS. 2-3, for example.

The device 600 may include a communication interface 602, a strike filter 604, a processor 606, and data storage 608. All of the components illustrated in FIG. 6 may be linked together by a communication link 610 (e.g., wired or wireless link). The device 600 may also include hardware to enable communication within the device 600 and between the device 600 and another computing device (not shown). The hardware may include transmitters, receivers, and antennas, for example.

The communication interface 602 may allow the device 600 to communicate with another device (not shown), such as a mobile phone, personal computer, etc. Thus, the communication interface 602 may be configured to receive input data from one or more computing devices, and may also be configured to send output data to the one or more computing devices. In some examples, the communication interface 602 may also maintain and manage records of data received and sent by the device 600. In other examples, records of data may be maintained and managed by other components of the device 600.

The strike filter 604 may be configured to receive input data from a geophysical collection device and filter the data as described within any of FIGS. 2-3. The data storage 608 may store program logic 612 that can be accessed and executed by the processor 606, and the processor may further execute functions of the strike filter as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving geophysical data collected based on characteristics of geographic features in an environment;
applying a directional filter to the received geophysical data in a first instance so as to provide first filtered data, wherein the directional filter modifies the received geophysical data along one direction while leaving data unchanged along other directions, wherein a filtering direction of the directional filter is determined based on properties in the received geophysical data;
updating the filtering direction based on properties in the first filtered data;
applying the directional filter to the received geophysical data in a subsequent instance using the updated filtering direction so as to provide subsequent filtered data; and
based on the updated filtering direction having a subsequent update less than a threshold, outputting a map having a representation of directionally filtered data, wherein the subsequent update is determined due to properties in the subsequent filtered data output from the subsequent instance.

2. The method of claim 1, wherein the geophysical data includes full tensor gradiometer data.

3. The method of claim 1, wherein applying the directional filter to the received geophysical data comprises applying a low-pass filter to remove high frequency data representative of geophysical features that run in a direction indicated by the filtering direction.

4. The method of claim 1, wherein the filtering direction is based on a direction determined by an angle $\theta$ calculated according to tan $$2\theta = 2\frac{T_{xy}(T_{xx} + T_{yy}) + T_{xz}T_{yz}}{T_{xx}^2 - T_{yy}^2 + T_{xz}^2 - T_{yz}^2},$$

where Txy, Txx, Tyy, Txz, and Tyz are components of a gradient tensor of the received geophysical data.

5. The method of claim 1, further comprising determining the filtering direction based on a characteristic horizontal direction of a gravity field estimated from a gradient tensor in the geophysical data.

6. The method of claim 1, further comprising processing the directionally filtered data to be consistent with a solution to the Laplace equation.

7. The method of claim 1, further comprising:
iteratively updating the filtering direction based on filtered data output from a previous application of the directional filter; and
applying the directional filter to the received geophysical data in additional subsequent instances until the subsequent update to the updated filtering direction is less than the threshold.

8. The method of claim 1, further comprising:
iteratively updating the filtering direction based on properties in outputs of previous iterations of filtered data; and
outputting the directionally filtered data based on a convergence of the updated filtering direction.

9. The method of claim 1, further comprising:
selecting data of the received geophysical data; and
wherein applying the directional filter to the received geophysical data comprises applying the directional filter to the selected data.

10. The method of claim 9, wherein selecting the data of the received geophysical data comprises:
assessing a directionality of a gradient field at given locations within the geophysical data; and
selecting data having a characteristic of an elongated gradient field.

11. A non-transitory computer-readable medium having stored therein instructions, that when executed by a device, cause the device to perform functions comprising:
receiving geophysical data collected based on characteristics of geographic features in an environment;
applying a directional filter to the received geophysical data in a first instance so as to provide first filtered data, wherein the directional filter modifies the received geophysical data along one direction while leaving data unchanged along other directions, wherein a filtering direction of the directional filter is determined based on properties in the received geophysical data;
updating the filtering direction based on properties in the first filtered data;
applying the directional filter to the received geophysical data in a subsequent instance using the updated filtering direction so as to provide subsequent filtered data; and
based on the updated filtering direction having a subsequent update less than a threshold, outputting a map having a representation of directionally filtered data, wherein the subsequent update is determined due to properties in the subsequent filtered data output from the subsequent instance.

12. The non-transitory computer-readable medium of claim 11, wherein the geophysical data includes full tensor gradiometer data.

13. The non-transitory computer-readable medium of claim 11, wherein applying the directional filter to the received geophysical data comprises applying a low-pass filter to remove high frequency data representative of geophysical features that run in a direction indicated by the filtering direction.

14. The non-transitory computer-readable medium of claim 11, further comprising determining the filtering direction based on a characteristic horizontal direction of a gravity field estimated from a gradient tensor in the geophysical data.

15. The non-transitory computer-readable medium of claim 11, further comprising:
iteratively updating the filtering direction based on filtered data output from a previous application of the directional filter; and
applying the directional filter to the received geophysical data in additional subsequent instances until the subsequent update to the updated filtering direction is less than the threshold.

16. The non-transitory computer-readable medium of claim 11, further comprising:
iteratively updating the filtering direction based on properties in outputs of previous iterations of filtered data; and
outputting the directionally filtered data based on a convergence of the updated filtering direction.

17. A device, comprising:
a processor; and
a computer-readable medium, configured to store instructions, that when executed by the processor, cause the device to perform functions comprising:

receiving geophysical data collected based on characteristics of geographic features in an environment;

applying a directional filter to the received geophysical data in a first instance so as to provide first filtered data, wherein the directional filter modifies the received geophysical data along one direction while leaving data unchanged along other directions, wherein a filtering direction of the directional filter is determined based on properties in the received geophysical data;

updating the filtering direction based on properties in the first filtered data;

applying the directional filter to the received geophysical data in a subsequent instance using the updated filtering direction so as to provide subsequent filtered data; and based on the updated filtering direction having a subsequent update less than a threshold, outputting a map having a representation of directionally filtered data, wherein the subsequent update is determined due to properties in the subsequent filtered data output from the subsequent instance.

18. The device of claim 17, further comprising:

iteratively updating the filtering direction based on filtered data output from a previous application of the directional filter; and applying the directional filter to the received geophysical data in additional subsequent instances until the subsequent update to the updated filtering direction is less than the threshold.

19. The device of claim 17, further comprising:

iteratively updating the filtering direction based on properties in outputs of previous iterations of filtered data; and outputting the directionally filtered data based on a convergence of the updated filtering direction.

20. The device of claim 17, further comprising:

assessing a directionality of a gradient field at given locations within the geophysical data; and selecting data of the received geophysical data having a characteristics of an elongated gradient field, wherein applying the directional filter to the received geophysical data comprises applying the directional filter to the selected data.

* * * * *